United States Patent

[11] 3,628,647

[72] Inventor John H. Beard
    Salisbury, N.C.
[21] Appl. No. 875,773
[22] Filed Nov. 12, 1969
[45] Patented Dec. 21, 1971
[73] Assignee Taylor Manufacturing Company
    Salisbury, N.C.

[54] ARTICLE COMBINER
    10 Claims, 4 Drawing Figs.
[52] U.S. Cl. .................................................. 198/30, 198/32
[51] Int. Cl. .................................................. B65g 47/22, B65g 47/26
[50] Field of Search .......................................... 198/29–30, 32, 33 AA

[56] References Cited
    UNITED STATES PATENTS
    3,117,665 1/1964 Nekola .......................... 198/30

FOREIGN PATENTS
660,186 10/1951 Great Britain ................ 198/32

Primary Examiner—Edward A. Sroka
Attorney—Parrott, Bell, Seltzer, Park & Gibson

ABSTRACT: An article combiner for receiving a plurality of articles advancing abreast and for arranging these articles in tandem relation to form a single row including conveyor means for conveying the articles along a predetermined path, and first and second guide means disposed in converging relation for guiding the articles as they are conveyed, one of the guide means comprising agitating means for agitating articles brought into contact therewith and buffer means for normally maintaining the articles out of contact with the agitating means but permitting contact therewith upon a jam-up of a plurality of articles between the guide means, and the other guide means including a guide rail formed of nonscarring, friction-reducing material.

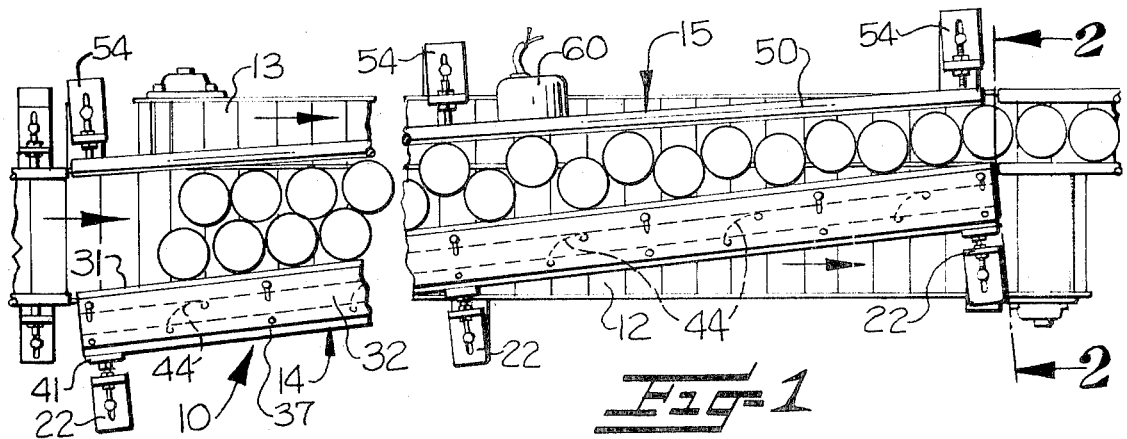
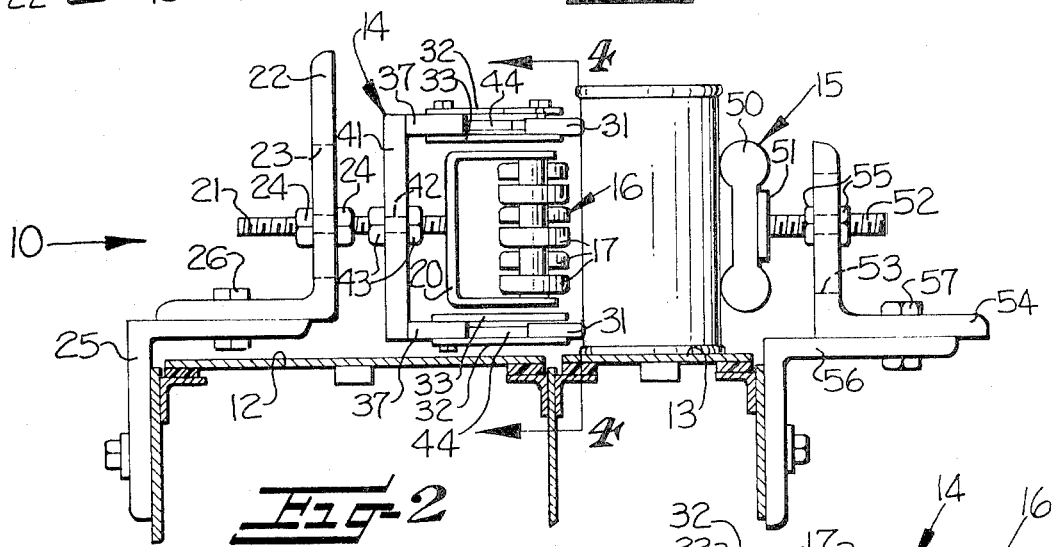
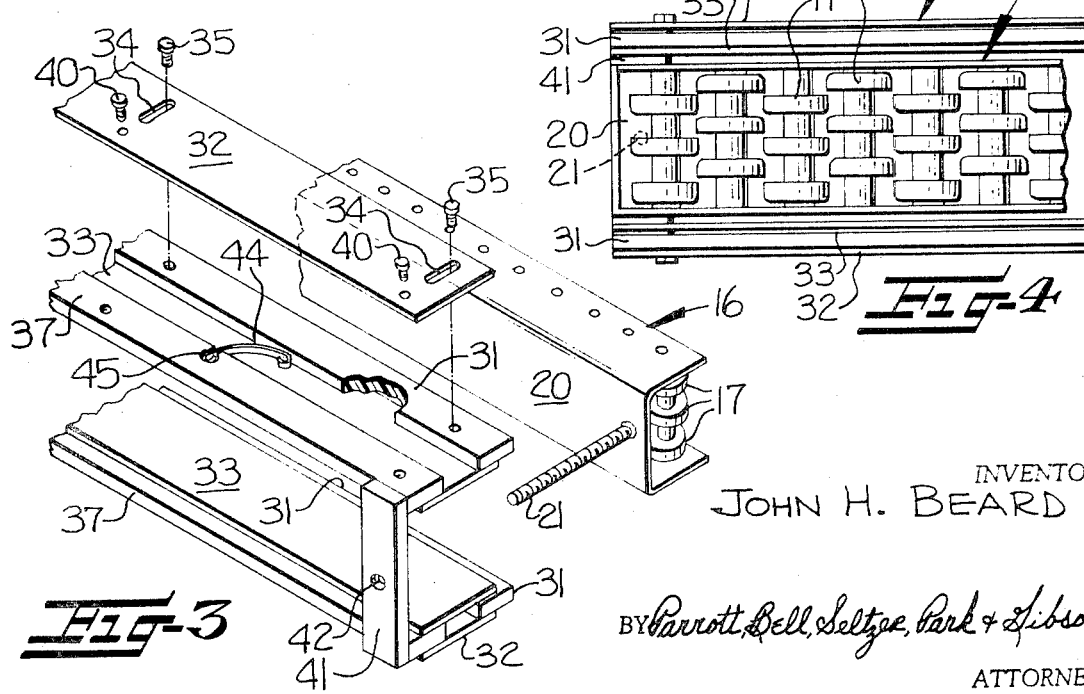

ARTICLE COMBINER

The present invention relates to article-handling apparatus and more particularly to an article combiner for combining a plurality of articles advancing abreast, or in a disorganized mass, into tandem relation to form a single row thereof.

In the packaging of fluids within containers and in many other similar article-handling operations, it is frequently necessary to transform a plurality of articles advancing abreast, or as a disorganized mass, into a single row for operations incident to the packaging operation or other operations in which the articles are being used. This arrangement of articles into a single row is fraught with problems particularly where a very high speed of travel of the articles is involved.

Most of such articles have a natural tendency to nest or move into tandem relation due in part to their complete or partial cylindrical configuration and, so long as the articles move smoothly in the forward direction, the majority of the articles will move into tandem relation under urging of converging guide rails normally employed for this purpose. However, jam-ups or instances where the articles do not move into tandem relation but become jammed between the guide rails are sufficiently frequent to materially interrupt the smooth operation of the packaging line or other article-handling operation and to be of much concern.

Many attempts have been made heretofore to provide apparatus which will prevent such jam-ups of articles between the guide rails or, in the event that such a jam-up occurs, to quickly dislodge the articles from the jammed condition so that they may continue to move forward. However, such previous attempts have been unsuccessful in that they have either not been effective for preventing the jam-ups or dislodging the articles from between the guide rails or have so materially interferred with forward movement of the articles as to completely negate the natural tendency of the articles to nest or move into tandem relation and have thereby introduced ancillary problems. These latter attempts have usually involved spring-pressed guide bars normally disposed in the path of travel of the articles and serving to retard their movement until the pressure of oncoming articles overcomes the spring bias thereof to move them out of the way and permit the articles to advance. This retardant against the smooth forward movement of the articles encourages jam-ups rather than obviating them.

It has been previously proposed that jam-ups be prevented by substantially agitating the articles at all times as they move along their predetermined path of travel. However, this continuous agitation is highly undesirable since it negates the natural tendency of the articles to nest or move into tandem relation and since, in the case of fragile articles, breakage frequently occurs.

With the foregoing in mind, it is an object of the present invention to provide an article combiner which arranges a plurality of articles advancing abreast in tandem relation to form a single row thereof without appreciably interfering with forward movement of the articles or their natural tendency to nest or move into tandem relation.

A more specific object of the present invention is to provide an article combiner of the character described wherein converging guide means are provided for smoothly guiding a plurality of articles advancing abreast into a single row with means being provided for quickly and effectively dislodging articles from a jam-up should one occur.

Some of the objects and advantages of the invention having been stated, others will appear as the description proceeds, when taken in connection with the accompanying drawings, in which FIG. 1 is a top plan view with portions broken away of an article-handling system incorporating the article combiner of the present invention;

FIG. 2 is an enlarged transverse sectional view taken substantially along line 2—2 in FIG. 1;

FIG. 3 is a fragmentary exploded isometric view of the guide means shown in the left-hand portion of FIG. 2; and FIG. 4 is a transverse sectional view taken substantially along the line 4—4 in FIG. 2.

Referring now more particularly to the drawings and particularly to FIG. 1, there is shown therein a portion of an article-handling system 10 for handling a large number of articles, such as cans, bottles and the like, at very high speed. This article-handling system may be utilized in connection with many conventional packaging lines, such as container-filling devices, labeling machines and the like, or in any other article-handling line operation where articles are desired to be arranged into a single row.

Article-handling system 10 includes conveyor means 11 for advancing the articles along a predetermined path of travel. Preferably, conveyor means 11 includes a first conveyor 12 having a width in excess of the diameters of a plurality of articles being conveyed thereby, such that the first conveyor 12 may advance a plurality of the articles abreast or as a disorganized mass. Conveyor means 11 also includes a second conveyor 13 substantially narrower than the first conveyor 12 and with a width slightly in excess of the transverse dimension or diameter of a single row of articles to be handled thereby. Conveyor 13 extends parallel to and adjacent to first conveyor 12 for a substantial portion of the terminal end portion of conveyor 12.

The terminal end portion of the first conveyor 12 and the beginning portion of the conveyor 13 form a part of the article combiner of the present invention, which also includes first and second guide means 14, 15 which are disposed in converging relation above and adjacent to these portions of first conveyor 12 and second conveyor 13. Preferably, the beginning portion of conveyor 13 overlaps with the terminal portion of first conveyor 12 for substantially the full length of the converging guide means 14 and 15.

First guide means 14 includes agitating means 16 for agitating articles brought into contact therewith to free the articles from any jammed condition and to facilitate arrangement thereof in tandem relation without appreciably interfering with forward movement thereof along the predetermined path of travel. Agitating means 16 comprises a bank of freely rotatable rollers 17 mounted for rotation about generally vertical axes extending parallel to the articles being conveyed by the conveyors. Rollers 17 are arranged in vertically extending rows and, as illustrated, there are three rollers in each row with the rollers of adjacent rows being staggered relative to each other and with their adjacent peripheral portions overlapping. These rollers 17 are preferably mounted within a channel-shaped member 20 with the inside portions thereof extending a predetermined distance inwardly from the inner edges of the legs of the channel member 20. Channel member 20 and rollers 17 are mounted by threaded bolts 21 on brackets 22 by having the end portions of the bolts 21 penetrating through vertically elongate openings 23 in brackets 22 and by having nuts 24 threadably received on bolts 21 on opposite sides of the brackets 22. By this means, the agitating means 16 is mounted for vertical adjustment relative to the conveyors 12 and 13 and relative to the articles being carried thereby. Brackets 22 in turn are mounted on brackets 25 carried by conveyor 12 by bolts 26 penetrating through aligned horizontally elongate openings in the brackets 22 and 25. By this means, the brackets 22 are mounted for horizontal adjustment relative to the conveyors 12 and 13 and thereby the agitating means 16 is also mounted for horizontal adjustment relative to these conveyors.

First guide means 14 also includes buffer means 30 for normally maintaining articles out of contact with agitating means 16 so as normally not to permit agitating means 16 to appreciably interfere with the natural tendency of the articles to nest or move into tandem relation but permitting contact of the articles with the agitating means 16 upon a predetermined resistance to further forward movement of certain articles, as upon a jam-up of articles between the first and second guide means, such that the agitating means 16 may agitate these articles and free them from any such jammed condition. As illustrated, buffer means 30 comprises a pair of vertically spaced-apart guide bars 31 preferably formed of nonscarring, friction-reducing material, such as high-density polystyrene. Guide bars 31 are mounted for limited horizontal movement toward and away from articles being carried by the conveyor means 12 and 13 by respective pairs of plates 32, 33 disposed in straddling relation to the guide bars 31 and having horizontally elongate openings 34 therein through which penetrate suitable mounting bolts 35, which also penetrate through openings 36 in the guide bars 31. THe pairs of plates 32, 33 are respectively secured to spaced-apart mounting bars 37 by suitable bolts 40 which penetrate through aligned openings therein and mount the guide bars 31 thereon in spaced relation to the bars 37. The bars 37 are connected at spaced locations by vertically extending bars 41 having openings 42 therethrough through which the bolts 21 carried by the channel member 20 of the agitating means 16 penetrate to mount the buffer means 30 on the brackets 22. Suitable nuts 43 are disposed on bolts 21 on opposite sides of the bars 41 to mount the buffer means 30 thereon for adjustment relative to the agitating means 16.

Guide bars 31 are biased inwardly toward the second guide means 15 and into contact with articles carried by the conveyors 12 and 13 by a plurality of springs 44 disposed between the guide bars 31 and the mounting bars 37. Preferably, the springs 44 are of the leaf type and include generally cylindrical end portions which are press fitted into cooperating keyhole openings 45 in the mounting bars 37 to maintain the same in position between the mounting bars 37 and the guide bars 31. The amount of force by which the guide bars 31 are biased into contact with the articles may be varied by proper selection of the type of leaf springs 44 employed and by increasing or decreasing the number of such springs positioned between the guide bars 31 and mounting bars 37. Also, the guide bars 31 are preferably longitudinally flexible such that the same will bend in the area where a transverse force is applied whereby articles immediately adjacent a jammed condition will be permitted to be brought into contact with the agitating means 16 while the articles at other locations along the guide bars 31 will still be maintained out of contact with the agitating means.

Second guide means 15 preferably comprises a guide rail 50 also preferably formed of a nonscarring, friction-reducing, plastic material, such as high-density polystyrene. Rail 50 is illustrated as being formed to have generally cylindrical longitudinal side edge portions with a connecting web portion of less thickness than the diameter of the cylindrical portions extending between the side edge whereby spaced-apart article-contacting surfaces are provided to further reduce the frictional drag placed upon articles brought into contact therewith. A mounting bar 51 is secured to the outside surface of the web portion of the rail 50 and has a plurality of bolts 52 secured thereto and extending outwardly therefrom. Bolts 52 extend through vertically elongate openings 53 in suitable brackets 54 and have a pair of nuts 55 disposed thereon in straddling relation to the brackets 54 for the vertical adjustment of the guide rail 50 relative to the conveyor means 12 and 13. Brackets 54 are in turn secured to brackets 55 carried by the conveyor 13 by suitable bolts 57 penetrating through aligned horizontally elongate openings therein for horizontal adjustment of the brackets 54 relative to the conveyor 13 and to thereby mount guide rail 50 for horizontal adjustment relative to conveyors 12 and 13.

In operation, the conveyor 12 conveys a disorganized mass, or at least a plurality of articles advancing abreast, between the first and second guide means 14 and 15 where such articles are brought into contact with the guide rail 50 on one side and the guide bars 31 on the other side. Such guide bars 31 and guide rail 50 do not materially interfere with forward movement of the articles therealong and, due to their converging relationship, the articles are gradually forced into nesting relationship. As the articles progress further along the guide bars 31 and guide rail 50 they are moved into tandem relationship. The guide means 14 and 15 are disposed in slanted relationship to the conveyors 12 and 13 such that as the articles move along the terminal end portion of the conveyor 12, they are shunted transversely thereof onto the beginning portion of conveyor 13.

So long as the articles may be moved smoothly into tandem relation to form a single row or line thereof, the articles are maintained out of contact with the rollers 17 of agitating means 16 by the guide bars 31 and therefore no agitation of the articles is provided and none is required. However, if desired, a vibrator 60 may be mounted on guide rail 50 for vibrating the same to gently facilitate movement of the articles into tandem relation.

Upon the occurrence of a jammed condition, as when a plurality of the articles become wedged between the first and second guide means 14 and 15, a predetermined resistance to forward movement of these articles will occur and this will exert a sufficient transverse force on the guide bars 31 to overcome the biasing action of the springs 44 in the area of the jammed condition and will move the guide bars 31 away from their normal position. THe articles immediately adjacent the jam-up therefore will be brought into contact with the rollers 17 of the agitating means 16. As the articles move over the surface of the rollers 17 and rotate the same, the articles will be rather severely agitated to free them from the jammed condition and permit them to move smoothly into tandem relation to form a single row. Once the articles are freed from the jammed condition, the guide bars 31 will be moved back to their normal position by the springs 44 where they will again maintain the articles out of contact with the agitating means 16.

It is therefore believed apparent that a novel article combiner for combining a plurality of articles advancing abreast into tandem relation to form a single row which does not appreciably interfere with forward movement of the articles or with the natural tendency of the articles to nest and move into tandem relation is provided by the present invention.

In the drawings and specifications there has been set forth a preferred embodiment of the invention, and although specific terms are employed, they are used in a generic and descriptive sense only and not for purposes of limitation:

What is claimed is:

1. An article combiner adapted to receive a plurality of articles advancing abreast and to arrange the articles in tandem relation to form a single row thereof without appreciably interfering with forward movement of the articles or their natural tendency to nest or move into tandem relation, said combiner comprising conveyor means adapted to receive the plurality of articles advancing abreast for conveying the articles along a predetermined path, and first and second guide means disposed above and adjacent to said conveyor means and arranged in converging relation for guiding the articles as they are conveyed along said predetermined path by said conveyor means and for arranging the plurality of articles advancing abreast into tandem relation to form a single row thereof, one of said guide means comprising agitating means driven by articles brought into contact therewith for agitating the same laterally of said path to facilitate arrangement thereof in tandem relation without appreciably interfering with forward movement thereof along said predetermined path of travel; and buffer means operatively associated with said agitating means for normally maintaining articles out of contact with said agitating means so as normally not to appreciably interfere with their natural tendency to nest or move into tandem relation but permitting contact with said agitating means upon a predetermined resistance to further forward movement of certain articles or jamming of a plurality of articles between said first and second guide means to agitate these articles and free them from this jammed condition.

2. An article combiner according to claim 1 wherein said other guide means comprises an elongate rail having guiding surfaces formed of a friction-reducing, nonscarring material and vibrating means for vibrating said guiding surfaces to facilitate the guidance of the articles thereby.

3. An article combiner according to claim 1 wherein said conveyor means comprises first and second conveyors arranged with the beginning portion of said second conveyor parallel to and juxtaposed with the terminal portion of said first conveyor and wherein said guide means extends along and in slanted relation to the juxtaposed portions of said conveyors to move the articles from the terminal portion of the first conveyor onto the beginning portion of the second conveyor as the articles are arranged into a single row.

4. An article combiner adapted to receive a plurality of articles advancing abreast and to arrange the articles in tandem relation to form a single row thereof without appreciably interfering with forward movement of the articles or their natural tendency to nest or move into tandem relation, said combiner comprising conveyor means adapted to receive the plurality of articles advancing abreast for conveying the articles along a predetermined path, and first and second guide means disposed above and adjacent to said conveyor means and arranged in converging relation for guiding the articles as they are conveyed along said predetermined path by said conveyor means and for arranging the plurality of articles advancing abreast into tandem relation to form a single row thereof, one of said guide means comprising a bank of agitating rollers mounted for substantially free rotation about axes perpendicular to said conveyor means and parallel to the articles carried thereby, said rollers being adapted to be rotated by articles brought into contact therewith and to agitate such articles to facilitate arrangement thereof in tandem relation without appreciably interfering with forward movement thereof along said predetermined path of travel, and buffer means operatively associated with at least a portion of said bank of rollers for normally maintaining articles out of contact with said rollers so as normally not to appreciably interfere with their natural tendency to nest or move into tandem relation but permitting contact therewith upon a predetermined resistance to further forward movement of certain articles or jamming of a plurality of articles between said first and second guide means to agitate these articles and free them from this jammed condition.

5. An article combiner according to claim 4 wherein said buffer means normally projects outwardly beyond said bank of rollers towards the other guide means, and including means for adjusting the relative positions of said bank of rollers and said buffer means to thereby vary the predetermined resistance to forward movement required for said buffer means to permit contact of the articles with said bank of rollers.

6. An article combiner according to claim 4 wherein said buffer means includes means normally projecting beyond said bank or rollers towards the other guide means but movable away from the other guide means in the area where the predetermined resistance to forward movement applies force thereto while remaining in projecting relationship to said rollers elsewhere.

7. An article combiner according to claim 4 wherein said buffer means comprises first and second bars extending respectively along the upper and lower longitudinal sides of said bank rollers and normally projecting inwardly toward the other guide means a predetermined distance beyond said bank of rollers but being movable away from said other guide means and relative to said rollers, and spring means biasing said first and second bars toward said other guide means and toward the normal position of said bars.

8. An article combiner according to claim 7 wherein said bars are longitudinally flexible so as to bend upon lateral force being applied, and wherein said spring means comprises a plurality of springs disposed at a plurality of spaced locations along each of said bars.

9. An article combiner according to claim 8 wherein said bars and said rollers are formed of a friction-reducing plastic material.

10. An article combiner according to claim 9 wherein said other guide means comprises an elongate guide rail formed of friction-reducing, nonscarring, plastic material, and including means mounting said first and second guide means for relative adjustment to vary the spring therebetween.

* * * * *